Figure 1:
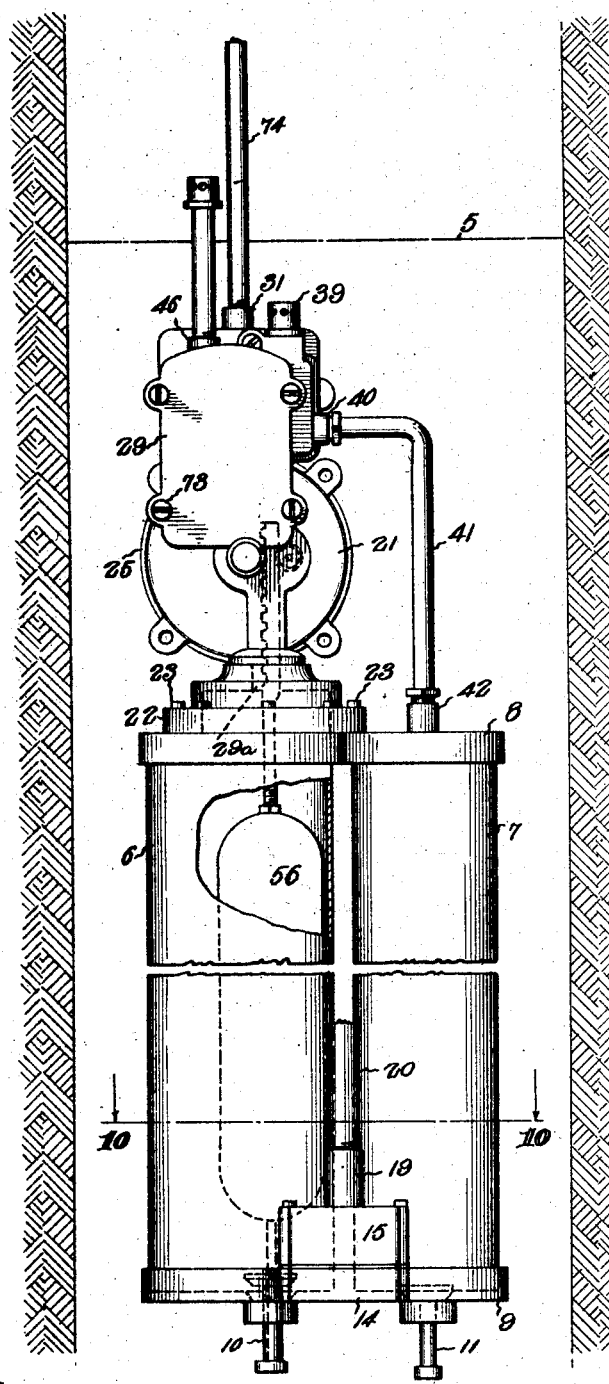

Theodore Peters, Inventor

Oct. 20, 1925.　　　　　　　　　　　　　　　　　　　1,558,273
T. PETERS
COMPRESSED AIR WATER ELEVATOR
Filed Jan. 14, 1925　　　3 Sheets-Sheet 3

Theodore Peters, Inventor

Patented Oct. 20, 1925.

1,558,273

UNITED STATES PATENT OFFICE.

THEODORE PETERS, OF FERDINAND, INDIANA.

COMPRESSED-AIR WATER ELEVATOR.

Application filed January 14, 1925. Serial No. 2,419.

*To all whom it may concern:*

Be it known that I, THEODORE PETERS, a citizen of the United States, residing at Ferdinand, in the county of Dubois and State of Indiana, have invented certain new and useful Improvements in Compressed-Air Water Elevators, of which the following is a specification.

This invention relates to certain new and useful improvements in compressed air water elevators, and has particular reference to devices of this kind employing a plurality of cylinders from which water is forced, the water being forced from one cylinder while the other is filling, so that a continuous stream of water or flow thereof is secured through the discharge line.

The primary object of the invention is to generally simplify and improve the construction of compressed air water elevators or air lift pumps disclosed in my United States Letters Patent, 1,077,997 dated November 11, 1913.

In the construction shown in my above mentioned patent the valves close in a direction opposite to the flow of compressed air, so that the valve operating mechanism had to act against the pressure of this air, resulting in a very unreliable operation.

It is accordingly an object of the present invention to overcome this defect by devising a valve arrangement and structure of valve operating mechanism whereby the valves may close in the direction in which the compressed air flows so that such compressed air aids the valves in seating tightly in the operation of the device.

Another object of the invention is to provide a valve operating mechanism for compressed air water elevators of the above kind, in which the number of movable and relatively movable parts is reduced to a minimum and wherein a minimum dependence is placed upon the use of undesirable parts such as springs which may readily get out of order.

The invention contemplates the provision of a pair of cylinders from which the water is alternately pumped, one cylinder filling with water while the other is being emptied.

The invention further embraces a valve mechanism whereby this operation may be effected by admitting compressed air to one cylinder while maintaining its exhaust port closed, at the same time preventing admission of air to the other cylinder while maintaining the exhaust port of the latter open.

A further object of the invention is to provide improved, simplified and quick acting means for automatically shifting these valves to effect the above operation by the utilization of power derived from the raising and falling of a float caused by the filling and emptying of one of the cylinders.

Still another object of the invention is to provide means whereby the actuation of the valves through the rise and fall of the float is made quite positive, and whereby the valves are effectively maintained against accidental displacement from either of their shifted positions.

With the above general objects in view and others that will become apparent as the nature of the invention is better understood, the same consists in the novel form, combination and arrangement of parts hereinafter more fully described, shown in the accompanying drawings and claimed.

In the drawings, wherein like reference characters indicate corresponding parts through the several views, Figure 1 is a front elevational view, partly broken away, of a compressed air water elevating device constructed in accordance with the present invention, the device being shown operatively disposed within a well.

Figure 2:
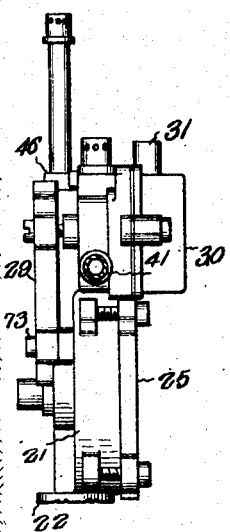
Figure 3:
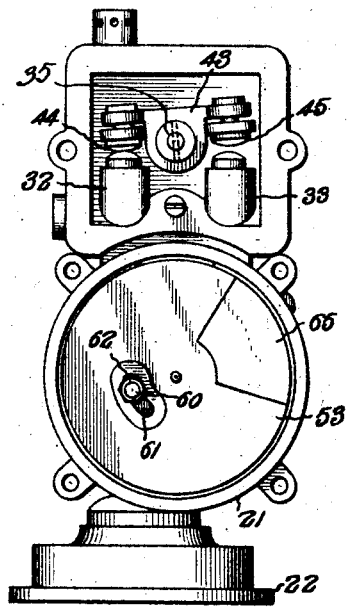
Figure 4:
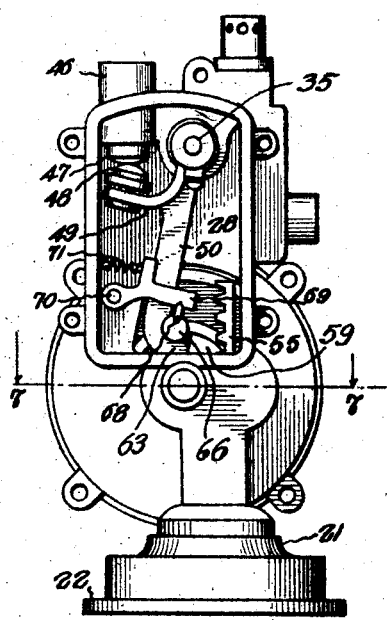
Figure 5:
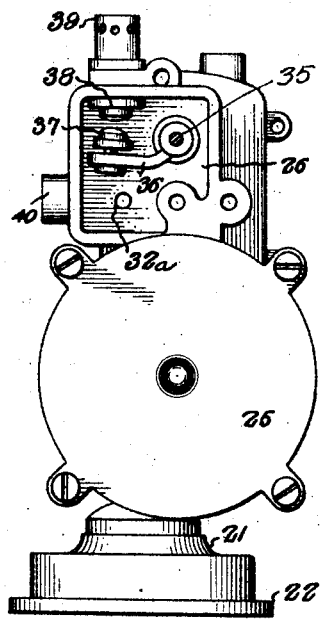
Figure 9:
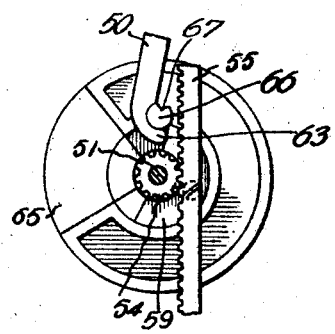
Figure 8:
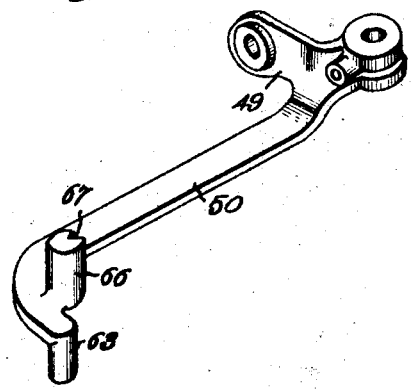
Figure 7:
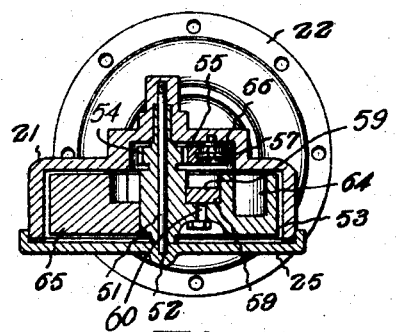
Figure 10:
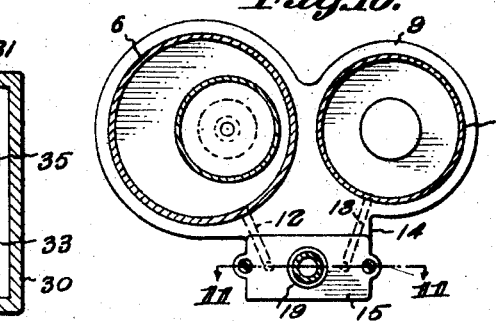
Figure 9:
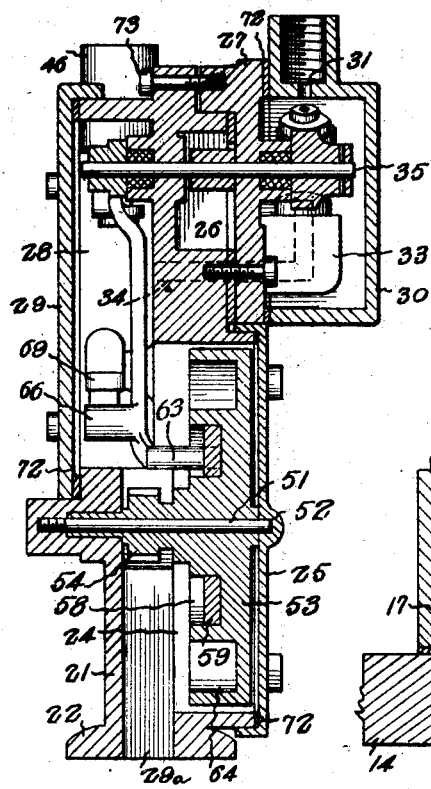
Figure 11:
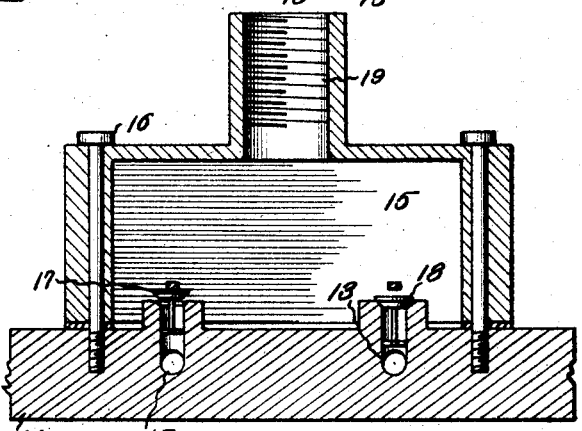

Figure 2 is a fragmentary view partly in section and partly in side elevation showing the upper portion of the device illustrated in Figure 1 and looking toward the left of the latter figure, Figure 3 is a rear elevational view of the device shown in Figure 2 with certain parts removed to reveal other parts, Figure 4 is a front elevational view of the device shown in Figure 3 with the front cover plate removed to reveal details of construction, Figure 5 is a view similar to Figure 3 with the lower rear cover plate in place and the removable partition removed from the upper part of the device, Figure 6 is a substantially central vertical sectional view of the device shown in Figure 2 drawn on a still larger scale, Figure 7 is a horizontal sectional view taken substantially upon line 7—7 of Figure 4, Figure 8 is an enlarged perspective view of the valve operating rod or lever, Figure 9 shows the weighted wheel and adjacent parts in elevation, the view being one looking toward the inner face of the wheel, and the adjacent parts being broken away, Figure 10 is a horizontal sectional view taken substantially upon line 10—10 of Figure 1, and Figure 11 is a section taken on the line 11—11 of Figure 10 and drawn on a greatly enlarged scale.

Referring more in detail to the drawings, the present invention comprises a unit adapted to be bodily submerged in the water as shown in Figure 1, the level of the water being indicated by dotted lines at 5 in this figure, and the structure being supported a suitable distance above the bottom of the well by any suitable means, not shown.

The present device or unit consists of a pair of cylinders 6 and 7 which are of different diameters and are adapted to be disposed in a vertical position as shown in Figure 1, the cylinders being rigidly associated by the provision of common closure members 8 and 9 for the tops and bottoms thereof respectively. The closure member 9 has a port forming a bottom inlet for the cylinder 6, which inlet is closed by a downwardly seating check valve 10 by means of which water is freely admitted into the cylinder 6 while prevented from flowing out of the same. A similar port is provided to constitute an inlet for the bottom of the cylinder 7 and this port is closed by a valve 11 similar to the valve 10. The cylinders 6 and 7 are provided with bottom outlet ports communicating with passages 12 and 13 provided in an extension 14 provided on the closure member 9 and these passages open into a common outlet chamber 15 secured upon the extension 14 by bolts 16 or the like. The outlet ends of the passages 12 and 13 are controlled by downwardly seating check valves 17 and 18 respectively by means of which the water flowing from the cylinders 6 and 7 into the chamber 15 is prevented from returning from said chamber back to the cylinders, and the chamber 15 is formed preferably in its top wall with an opening or outlet port 19 adapted to be connected to a discharge line 20 that conveys the water pumped from both of the cylinders to the desired point of disposal.

The valve mechanism embodies a casing including a main section 21 having a base 22 which is rigidly secured upon the upper closure member 8 in line with the larger cylinder 6 by means of bolts 23 or the like.

As best shown in Figures 3 and 6, the main section 21 of the casing is formed in its lower portion with a circular chamber 24, the rear side of which is open and is adapted to be closed by a removable plate 25. The casing section 21 is further formed with another chamber 26 entirely separate from and above the chamber 24, the chamber 26 also being open at its rear side and adapted to be closed by means of a removable partition member 27. Still another chamber 28 is formed in the front of the casing member 21 so as to extend from the top of the latter to a point substantially mid-way of the chamber 24, and the lower part of the chamber 28 communicates with the chamber 24 at the top of the latter as clearly shown in Figure 6, the open front side of the chamber 28 being closed by a removable plate 29. As shown in Figure 6 the casing member 21 is provided with a passage $29^a$ extending through the base 22 thereof and communicating with chamber 24, the passage $29^a$ being adapted to overlie a port provided through the upper closure member 8 and opening into the cylinder 6. It is thus apparent that compressed air will flow from the chamber 28 through chamber 24 and passage $29^a$ into the upper end of the cylinder 6.

A casing 30 is secured against the outer side of the partition member 27 so that the latter closes the adjacent open side of said casing 30, and an inlet port 31 is provided through the top of the casing 30 as clearly shown in Figure 6. Formed upon the outer side of the partition member 27 and projecting into the casing 30 are a pair of projections 32 and 33 which have passages that open through the tops of the projections 32 and 33 and through the partition 27, the passage of the projection 32 opening into the chamber 26, and the passage of the projection 33 being aligned with a passage 34 which is provided in the casing section 21 so as to open into the chamber 28. It is thus apparent that compressed air admitted into the casing 30 may pass into chamber 26 or chamber 28 depending upon which projection 32 or 33 has its passage open.

A horizontal shaft 35 is journaled in the casing so as to extend through the chamber 26 with its ends projecting into the casing 30 and the upper end of the chamber 28 as shown in Figure 6, and secured upon the intermediate portion of the shaft 35 is an arm 36 which is situated in the chamber 26 and carries a valve head 37 adapted to seat against a seat 38 when the arm 36 is swung upwardly by turning of shaft 35. The seat 38 surrounds an exhaust port for chamber 26, such port being provided with a perforated protecting cap 39 by means of which free exhaust of air is permitted while entrance of foreign matter or refuse is excluded. As shown more clearly in Figures 1 and 5 the chamber 26 is provided with a side outlet port 40 that is connected by means of a pipe 41 with a top inlet port 42 provided for the cylinder 7.

A cross bar 43 is secured upon the end of the shaft 35 which projects into the casing 30, and secured upon the ends of the cross bar 43 are valve heads 44 and 45 as best shown in Figure 3. The valve head 44 acts to close the passage in the projection 32 while the valve head 45 acts to close the passage in the enlargement or projection 33, the structure being such that when the shaft 35 is tilted in one direction the valve head 44 is seated and the valve head 45 unseated and vice versa. It is also noted that when the valve head 44 is seated to prevent passage of compressed air from the casing 30 into the chamber 26, the valve head 37 will be unseated for permitting exhaust of compressed air from cylinder 7 through pipe 41 and the exhaust port of chamber 26 which is controlled by the valve head 37.

The chamber 28 is provided with an exhaust port at the top thereof as generally indicated at 46, and a seat 47 is provided about this port within the chamber 28 as best shown in Figure 4, a valve head 48 being arranged to coact with the seat 47 and carried by a lateral arm 49 which is formed upon a lever 50, the upper end of which is secured upon the end of the shaft 35 which projects into the chamber 28. It is noted that when valve head 45 is unseated to permit compressed air to pass into chamber 28 from casing 30, the valve head 48 will be seated as shown in Figure 4 to prevent exhaust of the air through the exhaust port 46, the valve head 44 being seated and the valve head 37 unseated at this time. The valve heads are rigidly arranged in this relation at all times.

Rigidly carried by the casing section 21 and disposed in a horizontal position coincident with the axis of the circular chamber 24 is a spindle 51, the rear end of which is supported removably in a socket 52 provided in the closure plate 25. Revolubly mounted upon the shaft or spindle 51 is a wheel 53 to the forward or inner side of which is rigidly attached a spur pinion 54, said pinion 54 meshing with a vertically slidable rack bar which projects into the chamber 24 through the bottom of the casing and which has its lower end rigidly attached to a float 56 that is loosely disposed within the cylinder 6. The rack bar 55 is effectively maintained in mesh with the pinion 54 while freely permitted to slide vertically without undue friction, by the provision of an anti-friction roller 56″ that is journaled beside the spindle 51 so as to engage the outer smooth longitudinal edge of the rack bar 55, tendency of the rack bar 55 to be displaced laterally being prevented by the provision of a peripheral rib 57 on the roller 56′, which rib engages in a longitudinal groove provided in the adjacent face of the rack bar 55 as shown clearly in Figure 7.

As shown in Figures 6, 7 and 9, the wheel 53 is provided in its inner face and inwardly of its margin with a circular groove 58 in which is slidably disposed an adjusting stop plate 59 of arcuate form. The stop plate 59 may be rotarily adjusted relative to the wheel 53 by means of a bolt 60 which is rigid with the plate 59 and projects outwardly through an arcuate slot 61 provided in the wheel 53, the adjustment being maintained by means of a nut 62 threaded upon the bolt 60 and bearing upon the adjacent surface of the wheel 53.

Upon the lower end of the lever 50 there is provided a rigid rearwardly projecting lug 63, the rear free end of which is arranged in the path of movement of the stop plate 59 which moves with the wheel 53. It is thus obvious that when the wheel 53 is rotated in one direction one end of the plate 59 will engage the lug 63 to swing the lever 50 in one direction while rotation of the wheel 53 in the opposite direction will cause engagement of the lug 63 by the other end of the stop plate 59 for swinging the lever 50 in the opposite direction. The wheel 53 is provided in its inner face with a relatively large marginal groove 64 of arcuate form whereby the portion of the wheel having this groove is reduced in weight, and the remaining portion of the wheel is constituted by a segmental section 65 formed of relatively heavy material whereby the wheel is weighted at this point.

Projecting forwardly from and rigid with the lower end portion of lever 50 is a second lug 66 in the upper side of which is formed a longitudinal groove 67. Seated loosely in the groove 67 so as to rock therein in the direction of movement of the lever 50 is a member 68 whose upper end is mounted loosely for rocking movement in a groove provided on the under side of the free end of an arm 69 whose other end is pivotally attached to the casing as at 70 for vertical swinging movement, the arm 69 being pressed toward the lug 66 by means of a spring 71. It is noted that when the parts are disposed as shown in Figure 4 the lever 50 is positioned so that the lug 66 is to one side of a vertical plane intersecting the shaft 35 while, when the lever 50 is swung to open valve 48 said lever will be disposed with its lug 66 at the opposite side of such plane so that a past center device is thus formed by the provision of the members 68 and 69 so as to hold the lever 50 in either of its positions and to insure instantaneous movement of the lever past center from one position to the other and vice versa.

Suitable gaskets 72 are placed between separable parts such as between the casing 30 and the partition section 27 so as to insure air tight joints between these parts, the latter being detachably connected or bolted together as at 73. A pipe 74 is connected to the intake port 31 of the casing 30 for leading compressed air to the latter from any source of supply positioned above or upon the ground at a distant point.

Assuming that the parts are disposed as shown in Figure 1, the water will open valve 10 so as to enter and fill the large cylinder 6, thereby causing the float 56 to rise so that the various parts of the valve mechanism are positioned as shown in the remaining figures. Any suitable control means is then opened for permitting the compressed air to flow into pipe 74 from which it enters the casing 30 and passes through the passage of the projection 33 by reason of the valve 45 being open, passage of the air through the passage of the projection or lug 32 being prevented by reason of the fact that the valve 44 is closed at this time. The air then passes through passage 34 into chamber 28, through the latter and chamber 24 into the upper end of cylinder 6. It is noted that the air passes through opening 29a about the rack bar 55 when entering the cylinder 6 and upon reaching the latter it will force the water out of cylinder 6 into chamber 15 and then outwardly through the discharge line 20, the pressure from above closing the valve 10 at this time. While the above is taking place the exhaust port 38 of the chamber 26 is open as shown in Figure 5 so that air may readily pass out of the upper end of cylinder 7 through pipe 41, chamber 26 and outlet port 38. In this way the valve 11 is allowed to open for permitting the water to enter and fill the smaller cylinder 7. As the air forces the water out of the larger cylinder 6 the float 56 automatically lowers so that the rack bar 55 causes rotation of pinion 54 and wheel 53 until an end of stop plate 59 engages the lug 63 of lever 50 for swinging the latter toward the right of Figure 4 and Figure 9. In doing this the weight 65 is carried upwardly from the position of the same shown in Figure 9 until it passes a vertical plane intersecting the shaft 51, whereupon said weight 65 will act to increase the speed of rotation of wheel 53 under the action of gravity so that the end of stop plate 59 will strike a blow upon the lug 63 for insuring positive swinging of lever 50 to the right of Figure 4 as before mentioned. When the lever 50 is thus swung to the right of Figure 4 the shaft 35 is rocked so as to seat valve 45 and valve 37 while unseating valves 44 and 48. By this time cylinder 6 has been emptied of water through the discharge line 20 and air is prevented from passing to cylinder 6 but is permitted to pass into cylinder 7 through the passage of the projection or lug 32 and chamber 26 together with pipe 41. The compressed air then forces the water out of the smaller cylinder 7 through chamber 15 and discharge pipe or line 20, the cylinder 6 again filling at this time and causing rise of float 56. As the float 56 rises wheel 53 will be rotated so as to bring the other end of stop plate 59 into engagement with lug 63 of lever 50 as shown in Figures 4 and 9 for causing the lever 50 to be shifted to the position shown in Figure 4 wherein the valves 48 and 44 are again closed and the valves 45 and 37 opened. Upon this latter rotation of wheel 53 the weight 65 will pass a vertical plane intersecting shaft 51 and then quickly move to its position shown in Figure 9 so that the end of plate 59 will strike a blow upon the lug 63 of lever 50 for instantaneously shifting the lever 50 to the position shown in Figures 4 and 9. The above operation will automatically continue as long as compressed air is supplied to chamber 30 through supply pipes 74 and as long as the device is submerged in water for filling the cylinders 6 and 7. It is noted that when lever 50 is in one position the exhaust port of the large cylinder is closed while its compressed air supply port is opened, the supply port of the other cylinder being simultaneously closed and having its exhaust port opened. The plate 59 is adjustable relative to wheel 53 so as to insure engagement of the ends of the plate 59 with the lug 63 of lever 50 at the proper time after weight 65 has passed a point in vertical alignment with and above a plane intersecting shaft 51.

From the foregoing description it is believed that the construction and operation as well as the advantages of the present invention will be readily understood and appreciated by those skilled in the art.

Minor changes may be made without departing from the spirit or the scope of this invention as claimed.

What I claim as new is:—

1. A compressed air water elevator including a pair of water cylinders communicating with a source of supply of water, each cylinder having a port for the intake and exhaust of air, a casing associated with the water cylinders and having a plurality of chambers, one of said chambers having an air exhaust port and communicating with the air port of one cylinder, another of said chambers having an air exhaust port and communicating with the air port of the other cylinder, the third chamber being provided with a pair of separate ports respectively communicating with the first and second chambers and having a third port for connection with a source of compressed air supply, a pair of valves for controlling the pair of ports of the third chamber, separate valves for respectively controlling the air exhaust ports of the first and second named chambers, all of said valves being rigidly related and movably mounted for simultaneously closing the air exhaust port of one chamber and opening the air exhaust port of another chamber while opening the port of the third chamber which leads to the chamber having its air exhaust port closed and closing the port of said third chamber which leads to the chamber having its air exhaust port opened, and vice versa, and a float in one cylinder operatively connected to the valves.

2. A compressed air water elevator including a pair of water cylinders communicating with a source of supply of water, each cylinder having a port for the intake and exhaust of air, a casing associated with the water cylinders and having a plurality of chambers, one of said chambers having an air exhaust port and communicating with the air port of one cylinder, another of said chambers having an air exhaust port and communicating with the air port of the other cylinder, the third chamber being provided with a pair of separate ports respectively communicating with the first and second chambers and having a third port for connection with a source of compressed air supply, a pair of valves for controlling the pair of ports of the third chamber, separate valves for respectively controlling the air exhaust ports of the first and second named chambers, all of said valves being rigidly related and movably mounted for simultaneously closing the air exhaust port of one chamber and opening the air exhaust port of another chamber while opening the port of the third chamber which leads to the chamber having its air exhaust port closed and closing the port of said third chamber which leads to the chamber having its air exhaust port opened, and vice versa, and a float in one cylinder operatively connected to the valves, all of said valves being arranged to move in the direction of flow of air in seating.

3. A compressed air water elevator including a pair of water cylinders communicating with a source of supply of water, each cylinder having a port for the intake and exhaust of air, a casing associated with the water cylinders and having a plurality of chambers, one of said chambers having an air exhaust port and communicating with the air port of one cylinder, another of said chambers having an air exhaust port and communicating with the air port of the other cylinder, the third chamber being provided with a pair of separate ports respectively communicating with the first and second chambers and having a third port for connection with a source of compressed air supply, a single rock shaft, a plurality of arms rigid with the rock shaft, one arm having a valve for controlling the air exhaust port of one chamber, another arm having a valve for controlling the air exhaust port of another chamber, and the remaining arms having valves for controlling the separate ports of the third chamber which communicate respectively with the first and second named chambers, and a float in one cylinder operatively connected with the rock shaft for actuating the valves to alternately close the passages of the third chamber and the exhaust ports of the first and second chambers.

4. A compressed air water elevator including a pair of water cylinders communicating with a source of supply of water, each cylinder having a port for the intake and exhaust of air, a casing associated with the water cylinders and having a plurality of chambers each provided with an air pressure intake and exhaust, valves for controlling said exhausts, means including a rotary element and a lever intermittently operated thereby for actuating said valves, a float in one of said cylinders for operating said rotary element, and means for accelerating the final upward and downward movement of the float immediately prior to the actuation of said lever by said rotary element.

5. A compressed air water elevator including a pair of water cylinders communicating with a source of supply of water, each cylinder having a port for the intake and exhaust of air, a casing associated with the water cylinders and having a plurality of chambers each provided with an air pressure intake and exhaust, means for controlling said exhausts, a float in one of said cylinders for operating said means, and mechanism for accelerating the final upward and downward movement of the float immediately prior to the actuation of said means thereby, said mechanism embodying a wheel operatively connected to the float for rotation by the latter upon upward and downward movement of the same and embodying a portion of increased weight.

6. A compressed air water elevator comprising a pair of water cylinders communicating with a source of supply of water, valve mechanism mounted upon the cylinders for alternately controlling the supply and exhaust of compressed air to and from said cylinders, and a float in one of said cylinders operatively connected to the valve mechanism for actuating the latter, the operative connection between the float and the valve mechanism including a wheel rotated by the rise and fall of the float so as to turn in opposite directions, a depending lever movable to seat and unseat the valves of the valve mechanism, and an element carried by the wheel and engageable with the lever upon predetermined rotary movement of said wheel for shifting said lever.

7. A compressed air water elevator comprising a pair of water cylinders communicating with a source of supply of water, valve mechanism mounted upon the cylinders for alternately controlling the supply and exhaust of compressed air to and from said cylinders, and a float in one of said cylinders operatively connected to the valve mechanism for actuating the latter, the operative connection between the float and the valve mechanism including a wheel rotated by the rise and fall of the float so as to turn in opposite directions, a depending lever movable to seat and unseat the valves of the valve mechanism, and an element carried by the wheel and engageable with the lever upon predetermined rotary movement of said wheel for shifting said lever, the element for engaging and shifting the lever being adjustable rotarily with respect to the wheel.

8. A compressed air water elevator comprising a pair of water cylinders communicating with a source of supply of water, valve mechanism mounted upon the cylinders for alternately controlling the supply and exhaust of compressed air to and from said cylinders, and a float in one of said cylinders operatively connected to the valve mechanism for actuating the latter, the operative connection between the float and the valve mechanism including a wheel rotated by the rise and fall of the float so as to turn in opposite directions, a depending lever movable to seat and unseat the valves of the valve mechanism, and an element carried by the wheel and engageable with the lever upon predetermined rotary movement of said wheel for shifting said lever, said wheel having a weighted portion arranged to accelerate rotation of the wheel immediately prior to engagement of the element with the lever for shifting the latter upon final upward or downward movement of the float.

In testimony whereof I affix my signature.

THEODORE PETERS.